Patented July 18, 1939

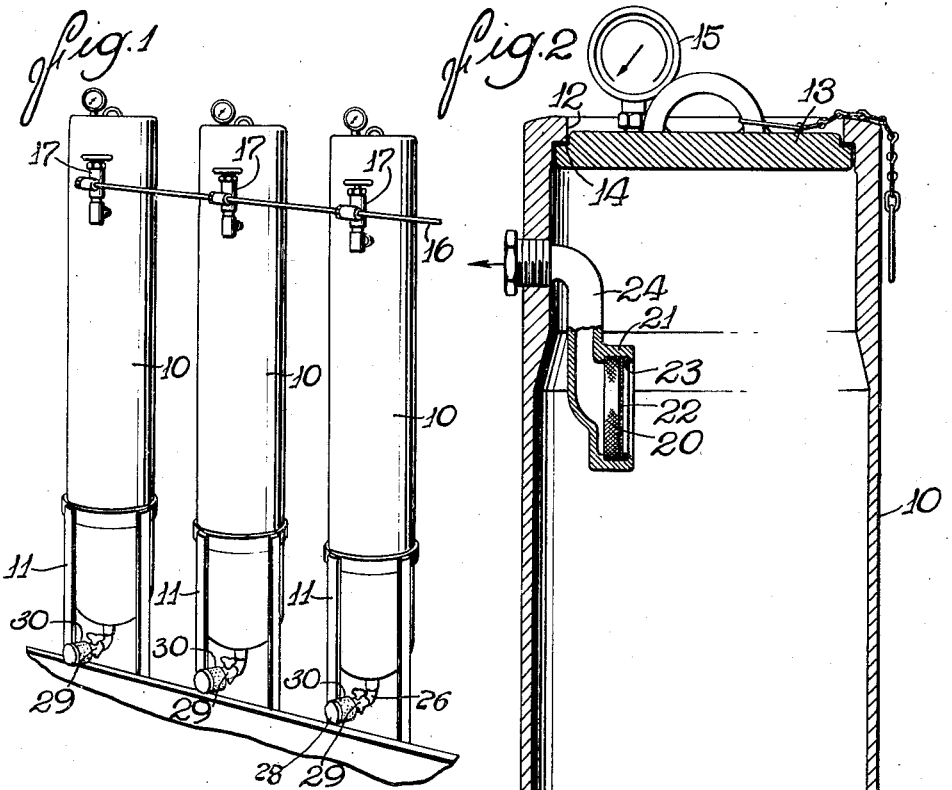
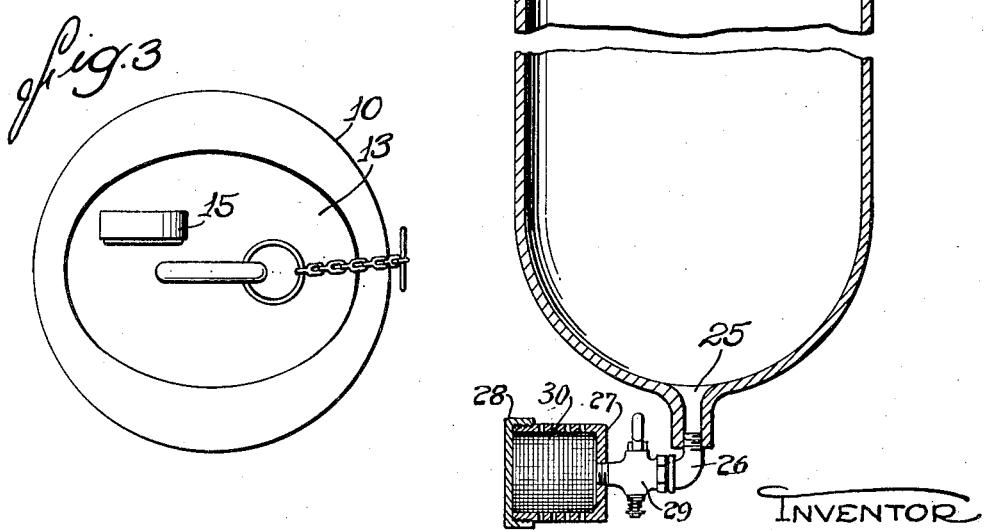

2,166,637

UNITED STATES PATENT OFFICE 2,166,637

CARBON DIOXIDE CONVERTER

Roy E. McIlrath, Wilmette, Ill.

Application November 1, 1937, Serial No. 172,133

2 Claims. (Cl. 62—91.5)

The invention relates to converters and more particularly to apparatus for converting solid carbon dioxide into gaseous form.

Many advantages, such as low cost of production as well as ease of handling in shipment, make it desirable to utilize carbon dioxide in its solid rather than liquid phase as a source of high-pressure gas. Gaseous carbon dioxide derived from such a source is commonly used for charging beverages, also for replenishing the charge in refrigerating machines and for other purposes. Heretofore difficulty has been encountered in converting solid carbon dioxide into gaseous form for use in charging beverages because of the small quantities of oil which are sometimes mixed with the carbon dioxide during its formation as a solid. This oil sometimes collects in the bottom of the converter chamber as the carbon dioxide is changing to gaseous form. After a quantity of oil has collected it passes out of the converter chamber with the gas and gives the charged beverage an unusual, not to say unpleasant, taste.

The general object of the present invention is to provide an improved form of converter mechanism adapted to change solid carbon dioxide into gaseous form while at the same time, preventing the commingling of any lubricating oil or similar adulterant with the carbon dioxide gas discharged from the converter.

Another object of the invention is to provide in a carbon dioxide converter mechanism an improved filter arrangement which is simple in construction and easy not only to inspect but also to manipulate.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawing in which Figure 1 is a general perspective view of a multicontainer carbon dioxide converter mechanism embodying the present invention.

Fig. 2 is an enlarged longitudinal sectional view of one of the converter containers included in the apparatus of Fig. 1.

Fig. 3 is a plan view of the top of the container shown in Fig. 2.

For convenience of illustration the invention has been shown and described herein as embodied in a carbon dioxide converter mechanism in which quantities of solid carbon dioxide are converted into gaseous form within a container and supplied to some point of use as, for example, in a beverage charging apparatus. It will be understood by those skilled in the art, however, that the present invention is applicable in many respects to other types of converters and there is consequently no intention to limit the invention to the particular embodiment shown. On the other hand, the appended claims are intended to cover all modifications and alternative constructions within the spirit and scope of the invention.

Upon reference to Fig. 1, it will be seen that the particular converter apparatus disclosed includes a plurality of vertically arranged cylindrical containers 10 carried on supporting racks or frameworks 11. Blocks of solid carbon dioxide are inserted in the containers 10 through large openings 12 (Fig. 2) in the upper ends thereof which expose the interiors of the containers to substantially their entire cross section. After the container has been loaded with the solid carbon dioxide a cover 13 is disposed across the opening 12 as shown in Fig. 2 with its peripheral edge portion abutting against a downwardly facing shoulder or flange 14 surrounding the opening of the container. Then, as the pressure within the container is increased, the cover 13 is pressed tightly against the shoulder, thereby forming an effective hermetic seal. The usual pressure gauge 15 may be mounted on the cover 13.

In order to convert the carbon dioxide within the container 10 from its solid to gaseous phase, the container is exposed to ordinary room temperature for a period of several hours. The solid carbon dioxide thus absorbs heat from the air about the container and changes into gaseous form building up a high pressure within the container. This high-pressure gas may then be drawn off through an outlet conduit 16. Shut-off valves 17 are preferably interposed between the high-pressure outlet lines 16 and the containers so that the amount of gas supplied from each container may be readily controlled.

As was previously noted, it is very undesirable that any lubricating oil or similar adulterant should be mixed with the carbon dioxide which is finally discharged through the outlet 16 for use in charging beverages or the like. Accordingly, an improved filter mechanism has been disclosed herein which effectively prevents the escape of lubricating oil from the interior of the container. Thus, in the particular arrangement shown in Fig. 2, a pad of porous filter material, such as a plurality of layers of filter paper 20, is interposed between the high-pressure side of the valve 17 and the interior of the container 10. This pad 20 may be of disk-shaped form and mounted within a cup-shaped container 21, being held in place therein by a screen 22 and retaining ring 23 threaded within the cup 21. Gas leaving the container 10 passes through the pad 20 into the bottom of the filter retaining cup 21 and through a suitable conduit 24 to the outlet. By so arranging the filter pad within the container it and its supporting structure are surrounded by a substantially equalized pressure and consequently the filter mechanism may be of comparatively light construction. The use of heavy reenforced structure difficult to seal and to manipulate is thus obviated. It will also be noted that the filter pad 20 is readily visible through the opening 12 at the top of the container so that whenever the operator opens the container for replenishing the supply of solid carbon dioxide, he can readily inspect the filter pad for any discoloration, indicating the necessity of replacement. By so placing the filter on the high-pressure side of the valve 17 any small diminution in pressure which the filter may cause will have no effect on the pressure on the outlet side of the valve.

The small quantities of lubricating oil and similar adulterants which are sometimes mixed with the solid carbon dioxide during the process of its formation condense in the form of small globules as the solid carbon dioxide changes to gaseous form and may accumulate in the bottom of the converter container, finally being discharged with the gas passing therefrom after a period of time. In order to overcome this difficulty, the container is preferably so fashioned that its interior walls slope to a single low point as indicated at 25 in Fig. 2 and a suitable blow-off cock device is positioned at this low point. In the particular construction illustrated, an elbow 26 is threaded in the bottom of the container at the low point 25 and communicates with a manually operable blow-off cock 29. Gas discharged from this cock in turn passes through a filter pad 30 disposed within a cage or apertured casing 27 having a removable end cap 28. The cartridge or pad of porous filter material 30 is removably disposed within the porous cylindrical casing 27. In the operation of the converter mechanism described, it is usually necessary to stop the flow of gas through the outlet 16 before the pressure within the container has been reduced to atmospheric value by the exhaustion of the gas contents. Consequently, in order to effect a removal of the cover 13 for replenishment of the solid carbon dioxide within the container, it is necessary to open some type of relief valve. The blow-off cock 29 serves this purpose and its particular disposition with respect to the interior walls of the container also insures that any lubricating oil or similar material accumulated within the container will be simultaneously discharged on the opening of the cock. Thus, when the blow-off cock 29 is opened, the high-pressure gas remaining within the container 10 flows downwardly over the inner walls of the container through the conduit 26 and this flow of high-pressure gas effectively scrubs the container walls entraining any small deposits of lubricating oil which may have accumulated at the bottom of the container. This entrained oil is taken up by the filter cartridge 30, however, so that if the gas is discharged from the blow-off cock directly into the room of the bottling works in which the converter is located, there will be no unsightly deposit of oil or dirt on the floor adjacent the cock. After continued use the filter pad 30 may be readily replaced by unscrewing the cap 28 and thus exposing the interior of the casing 27. The blow-off cock 29 is the only one provided so that the operator will be required to use it and thus automatically clear the interior of the container of oil every time he replenishes the contents. An improved form of blow-off cock for this purpose is disclosed in my copending application Serial No. 220,661, filed July 22, 1938.

I claim as my invention:

1. In an apparatus for converting solid carbon dioxide into gaseous carbon dioxide the combination of a container adapted to receive a quantity of solid carbon dioxide and having an opening in the upper end thereof, a removable closure means for hermetically sealing said opening, a conduit for conveying gaseous carbon dioxide from said container, and means including a removable pad of porous filter material disposed in said container surrounded by gas of equalized pressure and in a position readily visible through said opening between the interior of said container and the terminus of said outlet conduit for trapping lubricating oil or the like commingled with the gaseous carbon dioxide, whereby the carbon dioxide converted from solid to gaseous form and discharged from the container is freed of oil or other adulterants and in suitable condition for beverage purposes.

2. A solid to gaseous converter for carbon dioxide or the like comprising, in combination, an elongated vertical tubular container having an opening in the top thereof adapted to expose the interior of the container for the insertion of masses of solid carbon dioxide therein, a removable closure for said opening, a conduit for conveying gaseous carbon dioxide from said container terminating within said container adjacent said opening therein, a pad of porous filter material, means including a cage fashioned on the inner end of said conduit for supporting said pad of filter material across the end of said conduit and in a position surrounded by gas of equalized pressure within said container and in a position readily visible through said opening, whereby the carbon dioxide converted from solid to gaseous form and discharged from the container through said conduit and filter pad is freed of oil or other adulterants and in suitable condition for beverage purposes or the like.

ROY E. McILRATH.